Dec. 29, 1925.
H. L. CARR
1,567,035
HARROW TOOTH
Filed March 5, 1925
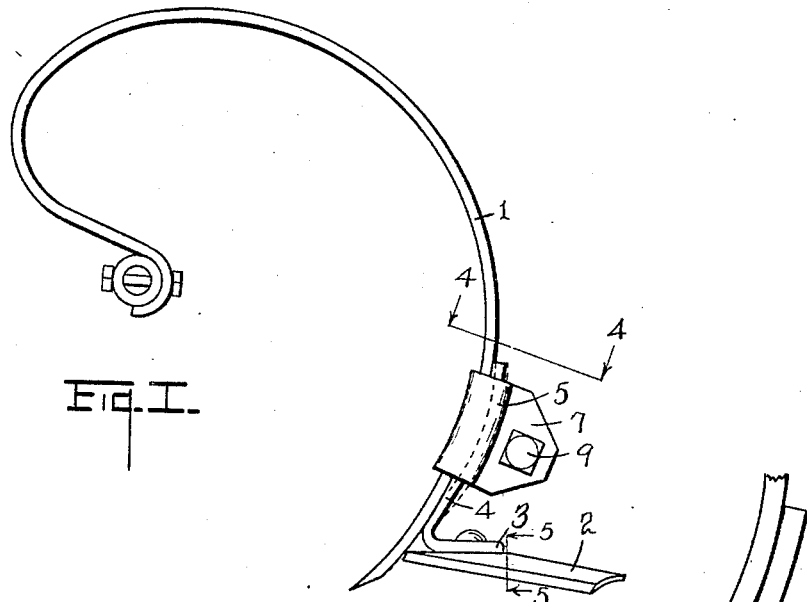
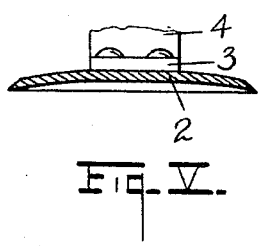
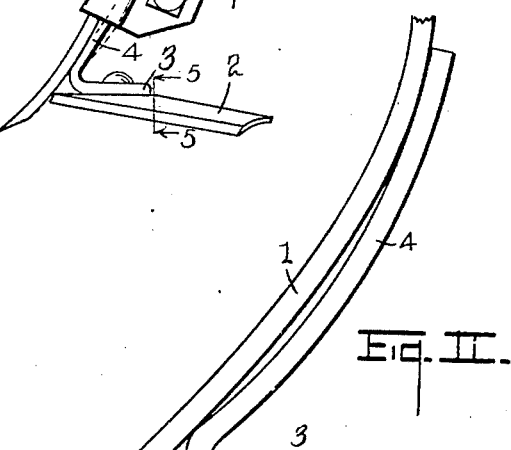
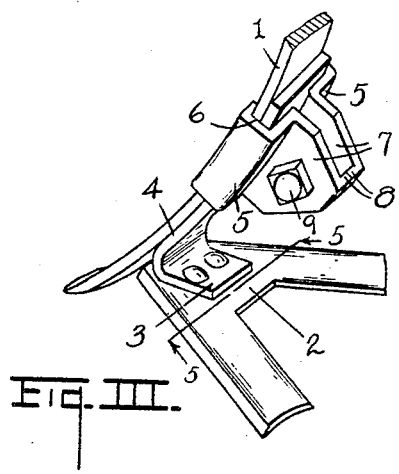
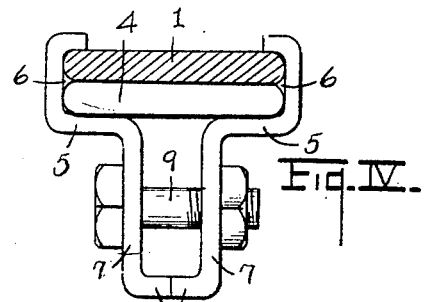
INVENTOR
*Harry L Carr*
BY
*Chappell Earl*
ATTORNEYS Patented Dec. 29, 1925.

1,567,035

UNITED STATES PATENT OFFICE.

HARRY L. CARR, OF HASTINGS, MICHIGAN.

HARROW TOOTH.

Application filed March 5, 1925. Serial No. 13,240.

*To all whom it may concern:*

Be it known that I, HARRY L. CARR, a citizen of the United States, residing at Hastings, county of Barry, State of Michigan, have invented certain new and useful Improvements in Harrow Teeth, of which the following is a specification.

This invention relates to improvements in harrow teeth.

The main objects of this invention are:

First, to provide an improved harrow tooth which effectively loosens the soil and at the same time cuts the roots of weeds or the like below the surface.

Second, to provide an attachment for spring harrow teeth which may be easily applied to or removed from the tooth and when attached is very secure.

Objects pertaining to details and economies of my invention will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this application, in which:

Fig. I is a side view of a harrow tooth embodying the features of my invention.

Fig. II is a detail side view of a portion of the tooth and the shank of the blade.

Fig. III is a perspective view of a portion of the harrow tooth being broken away.

Fig. IV is a sectional view on a line corresponding to line 4—4 of Fig. I.

Fig. V is a detail view in vertical section on a line corresponding to line 5—5 of Fig. III.

In the drawing similar numerals of reference refer to similar parts in all of the views, and the sectional views are taken looking in the direction of the little arrows at the ends of the section lines.

Referring to the drawing, 1 is a spring harrow tooth of well-known type. I provide a triangular or A-shaped blade 2 which is secured to the under side of the arm 3 at the lower end of the shank 4. This shank is, in the structure illustrated, formed of spring material, the width of the shank corresponding to that of the tooth. The curvature of the shank, however, is different from that of the tooth as shown in Fig. II. The shank is disposed against the rear side of the tooth so that the blade is supported with its apex at the rear of the tooth and in spaced relation to the point of the tooth.

The shank is secured to the tooth by means of a pair of clamp members 5 journaled or conformed at 6 to embrace the edges of the blade and shank as clearly shown in the drawing. These shank members have rearwardly projecting ears 7 having inturned abutting flanges 8 at their rear edges. The clamping bolt 9 is arranged through the ears 7 drawing the clamps firmly upon the edges of the shank and blade, springing them together as shown in Figs. I and III so that the parts are held under spring tension. This effectively prevents slipping and avoids the necessity for great accuracy in the forming of the clamp or the adaptation of the clamp to slight variations in the thickness of the shank and tooth, and also provides for effective securing of the parts, even where the tooth is considerably worn.

The diverging arms of the blade are curved upwardly transversely, their curves being extended or continued to the tip of the blade. The outer or cutting edges of the blade are upwardly beveled. By thus shaping the blade, it tends to hold to the ground and further the wear tends to maintain a sharp cutting edge.

Harrows equipped with my improved teeth are very effective as weed destroyers, the surface of the ground being fully covered and thoroughly stirred and worked. The parts are simple and economical to produce and the blade and clamp may be furnished as attachments for harrows in the hands of the user and attached or removed, according to the work to be performed.

Having thus described my invention, what I claim as new and desire to secure by Letters Patent is:

1. The combination of a spring harrow tooth, a triangular blade disposed horizontally with its apex at the rear of the tooth and in spaced relation to the point thereof, a curved spring shank for said blade disposed against the rear side of said tooth, the tooth and shank being of different curvature, a pair of inwardly facing channeled clamp members embracing the edges of the tooth and shank, said clamp members having rearwardly projecting ears with inturned co-engaging flanges at their rear edges, and a clamping bolt disposed through said ears whereby the clamp members are clamped upon the tooth and shank and the tooth and shank are sprung together.

2. The combination of a spring harrow tooth, a triangular blade disposed horizontally with its apex at the rear of the tooth and in spaced relation to the point thereof, a curved spring shank for said blade disposed against the rear side of said tooth, the tooth and shank being of different curvature, and a pair of inwardly facing channeled clamp members embracing the edges of the tooth and shank whereby the tooth and shank are sprung together.

3. The combination of a harrow tooth, a triangular blade disposed horizontally with its apex at the rear of the tooth and in spaced relation to the point thereof, a shank for said blade disposed against the rear side of said tooth, a pair of inwardly facing channeled clamp members embracing the edges of the tooth and shank, said clamp members having rearwardly projecting ears with inturned co-engaging flanges at their rear edges, and a clamping bolt disposed through said ears.

4. The combination of a harrow tooth, a triangular blade disposed horizontally with its apex at the rear of the tooth and in spaced relation to the point thereof, a shank for said blade disposed against the rear side of said tooth, a pair of inwardly facing channeled clamp members embracing the edges of the tooth and shank, and a clamping bolt for said clamp members.

5. The combination of a curved spring harrow tooth, a triangular horizontally disposed blade, a shank for said blade disposed at the rear of said tooth, and means for securing said shank to said tooth comprising a pair of clamps engaging the opposed edges of the tooth and shank and a clamping bolt for said clamp members.

6. The combination of a curved spring harrow tooth, a triangular horizontally disposed blade, a shank for said blade disposed at the rear of said tooth, and a clamp for securing said shank to said tooth whereby the parts are placed under spring tension by the springing of the tooth.

7. The combination of a harrow tooth, a triangular horizontally disposed blade, a spring shank for said blade disposed at the rear of said tooth, and a clamp for securing said shank to said tooth whereby the parts are placed under spring tension by the springing of the shank.

8. The combination of a harrow tooth, and a triangular horizontally disposed blade provided with a shank at its tip secured to the rear side of said tooth supporting the blade with its apex at the rear of the tooth and in spaced relation to the point of the tooth, said blade being upwardly and inwardly curved from each cutting edge thereof.

9. The combination of a harrow tooth, and a triangular horizontally disposed blade secured to said tooth with its apex at the rear of the tooth and in spaced relation to the point of the tooth, said blade being upwardly and inwardly curved from each cutting edge thereof.

10. The combination of a harrow tooth, and an A-shaped horizontally disposed blade, the arms of said blade being upwardly curved transversely of the arms, the curve being continued to the apex of said blade, the outer edges of the blade being upwardly beveled, said blade being secured with its apex at the rear of said tooth and in spaced relation to the point thereof.

In witness whereof I have hereunto set my hand.

HARRY L. CARR.